US010018392B2

United States Patent
Guo

(10) Patent No.: US 10,018,392 B2
(45) Date of Patent: Jul. 10, 2018

(54) SYSTEM AND METHOD FOR CONTROLLING A VARIABLE-CAPACITY COMPRESSOR

(71) Applicant: Emerson Climate Technologies, Inc., Sidney, OH (US)

(72) Inventor: LiYing Guo, Dayton, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 321 days.

(21) Appl. No.: 14/734,115

(22) Filed: Jun. 9, 2015

(65) Prior Publication Data

US 2016/0018147 A1    Jan. 21, 2016

Related U.S. Application Data

(60) Provisional application No. 62/009,568, filed on Jun. 9, 2014.

(51) Int. Cl.
*F25B 1/00*      (2006.01)
*F25B 49/00*    (2006.01)
(Continued)

(52) U.S. Cl.
CPC ............ *F25B 49/022* (2013.01); *F25B 49/02* (2013.01); *F25B 1/10* (2013.01); *F25B 13/00* (2013.01);
(Continued)

(58) Field of Classification Search
CPC ........ F25B 13/00; F25B 1/10; F25B 2400/13; F25B 2500/19; F25B 2500/27;
(Continued)

(56) References Cited

U.S. PATENT DOCUMENTS 4,228,846 A    10/1980  Smorol
4,248,053 A *   2/1981  Sisk ...................... F04B 49/126
                                                            236/1 E
(Continued)

FOREIGN PATENT DOCUMENTS

CN    1272171 A    11/2000
CN    1573261 A     2/2005
(Continued)

OTHER PUBLICATIONS

International Search Report regarding International Application No. PCT/US2015/034862, dated Sep. 17, 2015.
(Continued)

*Primary Examiner* — Henry Crenshaw
(74) *Attorney, Agent, or Firm* — Harness, Dickey & Pierce, P.L.C.

(57) ABSTRACT

A climate-control system is provided that includes a variable-capacity compressor unit and a control module controlling the compressor unit. The compressor unit is operable in a first capacity mode and in a second capacity mode that is higher than the first capacity mode. The control module may be configured to switch the compressor unit among a shutdown state, the first capacity mode and the second capacity mode based on a demand signal and a number of times that the compressor unit has been switched into the shutdown state within a predetermined time period.

12 Claims, 2 Drawing Sheets

Figure 1:
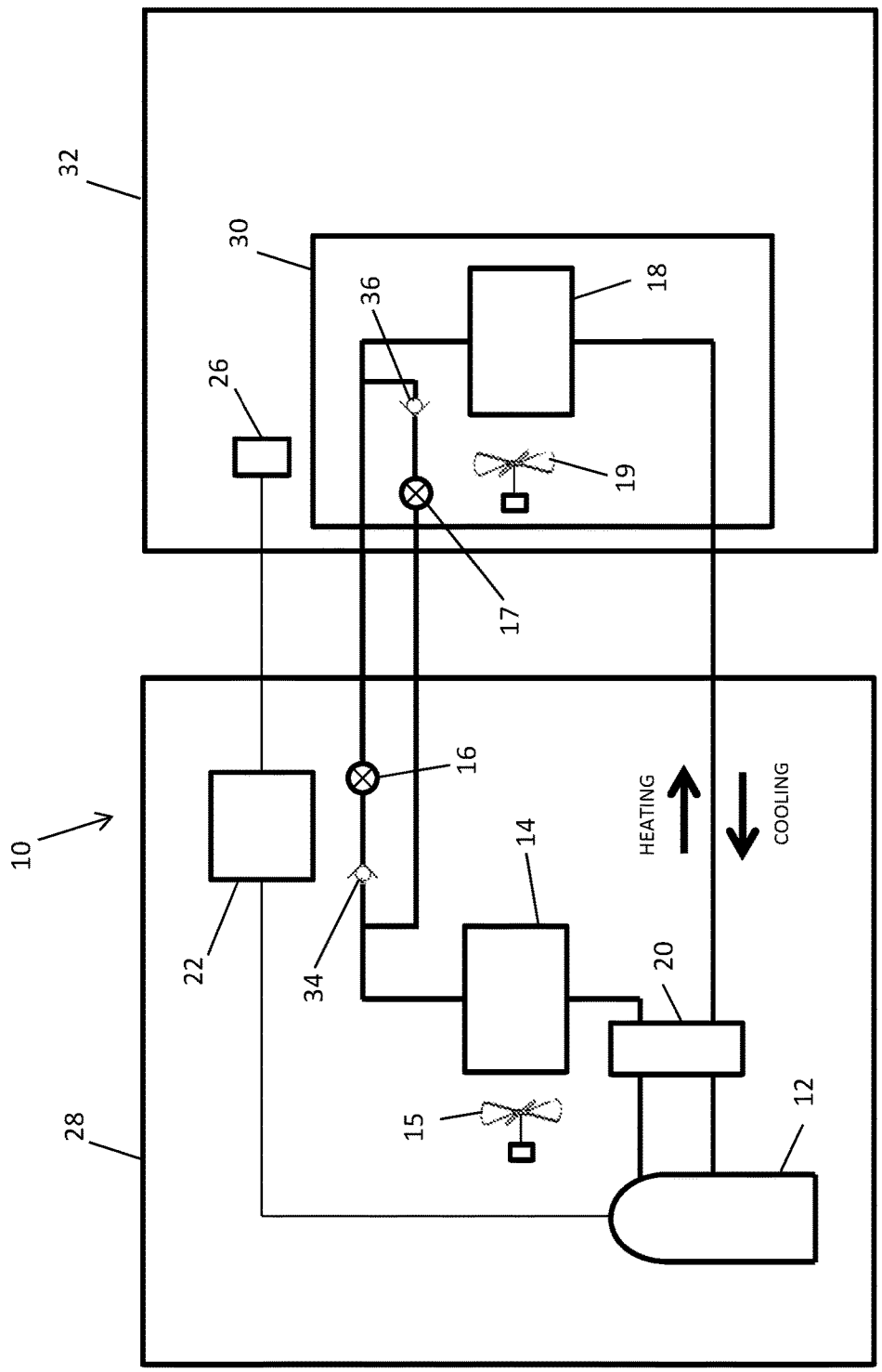

(51) Int. Cl.
*F25B 49/02* (2006.01)
*F25B 1/10* (2006.01)
*F25B 13/00* (2006.01)

(52) U.S. Cl.
CPC ....... *F25B 2400/13* (2013.01); *F25B 2500/19* (2013.01); *F25B 2500/27* (2013.01); *F25B 2600/01* (2013.01); *F25B 2600/0251* (2013.01); *F25B 2600/0253* (2013.01); *F25B 2600/0272* (2013.01); *F25B 2600/23* (2013.01); *F25B 2700/2104* (2013.01); *Y02B 30/741* (2013.01)

(58) Field of Classification Search
CPC .......... F25B 2600/01; F25B 2600/0251; F25B 2600/0253; F25B 2600/0272; F25B 2600/23; F25B 2700/2104; F25B 49/02; F25B 49/022; Y02B 30/741
USPC .......................................................... 62/230
See application file for complete search history.

(56) References Cited

U.S. PATENT DOCUMENTS

| | | | |
|---|---|---|---|
| 4,419,866 A * | 12/1983 | Howland | B60H 1/00014 123/198 D |
| 4,494,382 A * | 1/1985 | Raymond | F25B 5/00 417/280 |
| 5,078,318 A * | 1/1992 | Kawai | F24D 19/1087 237/2 B |
| 5,271,556 A | 12/1993 | Helt et al. | |
| 5,385,453 A | 1/1995 | Fogt et al. | |
| 5,806,760 A | 9/1998 | Maiello | |
| 6,058,729 A | 5/2000 | Lifson et al. | |
| 6,134,901 A * | 10/2000 | Harvest | F24F 11/008 62/157 |
| 6,213,731 B1 | 4/2001 | Doepker et al. | |
| 6,370,894 B1 | 4/2002 | Thompson et al. | |
| 6,389,822 B1 * | 5/2002 | Schanin | F25D 29/00 221/150 R |
| 6,389,823 B1 | 5/2002 | Loprete et al. | |
| 6,679,072 B2 | 1/2004 | Pham et al. | |
| 6,843,425 B2 | 1/2005 | Lee | |
| 7,228,694 B2 | 6/2007 | Schwarz et al. | |
| 7,455,238 B2 | 11/2008 | Hugghins | |
| 7,458,227 B2 | 12/2008 | Lee et al. | |
| 7,513,123 B2 | 4/2009 | Lee et al. | |
| 7,513,124 B2 | 4/2009 | Lee et al. | |
| 7,628,028 B2 | 12/2009 | Tolbert, Jr. et al. | |
| 7,946,123 B2 | 5/2011 | Tolbert, Jr. et al. | |
| 8,011,199 B1 * | 9/2011 | Chen | F25B 49/022 62/157 |
| 8,459,053 B2 | 6/2013 | Pham et al. | |
| 8,485,789 B2 | 7/2013 | Gu et al. | |
| 8,585,382 B2 | 11/2013 | Akei et al. | |
| 8,601,828 B2 | 12/2013 | Moseley | |
| 8,616,014 B2 | 12/2013 | Stover et al. | |
| 9,074,787 B2 | 7/2015 | Kitagishi et al. | |
| 2002/0088240 A1 | 7/2002 | Shi et al. | |
| 2006/0032253 A1 | 2/2006 | Lee et al. | |
| 2006/0283965 A1 * | 12/2006 | Mueller | F24F 11/0012 236/51 |
| 2007/0214817 A1 | 9/2007 | Inaba | |
| 2007/0227167 A1 | 10/2007 | Shapiro | |
| 2008/0073440 A1 | 3/2008 | Butler et al. | |
| 2010/0218527 A1 * | 9/2010 | Kitagishi | F24F 11/008 62/228.5 |
| 2013/0025304 A1 * | 1/2013 | Dorman | F25B 41/043 62/115 |
| 2013/0186111 A1 * | 7/2013 | Kim | F25B 49/022 62/56 |
| 2014/0196489 A1 * | 7/2014 | Emo | F25B 49/02 62/115 |
| 2015/0276291 A1 | 10/2015 | Pham et al. | |
| 2016/0341460 A1 | 11/2016 | Pham et al. | |

FOREIGN PATENT DOCUMENTS

| | | |
|---|---|---|
| CN | 1734196 A | 2/2006 |
| EP | 0127559 A1 | 12/1984 |
| EP | 1241417 A1 | 9/2002 |
| EP | 1684025 A1 | 7/2006 |
| JP | H04214158 A | 8/1992 |
| JP | 2745836 B2 | 4/1998 |
| JP | 2002061925 A * | 2/2002 |
| JP | 2002061925 A | 2/2002 |
| KR | 100661919 B1 | 12/2006 |

OTHER PUBLICATIONS

Written Opinion of the International Searching Authority regarding International Application No. PCT/US2015/034862, dated Sep. 17, 2015.
"38TDA Two-Speed Air Conditioning Unit—Installation and Start-Up Instructions." Carrier Heating and Cooling. Catalog No. 563-707. Form 38TDA-2SI. Nov. 1998.
"Installer's System Setup Guide." Lennox Industries, Inc. Sep. 2012.
International Search Report regarding International Application No. PCT/US2015/023889, dated Jul. 14, 2015.
Written Opinion of the International Searching Authority regarding International Application No. PCT/US2015/023889, dated Jul. 14, 2015.
Office Action regarding Chinese Patent Application No. 201580018201.7, dated Apr. 12, 2017. Translation provided by Unitalen Attorneys at Law.
Office Action regarding South Korean Patent Application No. 10-2016-7030477, dated Sep. 18, 2017. Translation provided by Y.S. Chang & Associates.
Restriction and Election of Species Requirement regarding U.S. Appl. No. 14/674,980, dated Oct. 4, 2017.
Search Report regarding European Patent Application No. 15772694.4, dated Oct. 19, 2017.
Office Action regarding Chinese Patent Application No. 201580018201.7, dated Nov. 9, 2017. Translation provided by Unitalen Attorneys at Law.
Non-Final Office Action regarding U.S. Appl. No. 14/674,980 dated Feb. 6, 2018.

* cited by examiner

SYSTEM AND METHOD FOR CONTROLLING A VARIABLE-CAPACITY COMPRESSOR

CROSS-REFERENCE TO RELATED APPLICATION

This application claims the benefit of U.S. Provisional Application No. 62/009,568, filed on Jun. 9, 2014. The entire disclosure of the above application is incorporated herein by reference.

FIELD

The present disclosure relates to a climate-control system having a variable-capacity compressor.

BACKGROUND

This section provides background information related to the present disclosure and is not necessarily prior art.

A climate-control system such as, for example, a heat-pump system, a refrigeration system, or an air conditioning system, may include a fluid circuit having an outdoor heat exchanger, an indoor heat exchanger, an expansion device disposed between the indoor and outdoor heat exchangers, and a compressor circulating a working fluid (e.g., refrigerant or carbon dioxide) between the indoor and outdoor heat exchangers. Varying a capacity of the compressor can impact the energy-efficiency of the system and the speed with which the system is able to heat or cool a room or space.

SUMMARY

This section provides a general summary of the disclosure, and is not a comprehensive disclosure of its full scope or all of its features.

In one form, the present disclosure provides a climate-control system is provided that includes a variable-capacity compressor unit and a control module controlling the compressor unit. The compressor unit is operable in a first capacity mode and in a second capacity mode that is higher than the first capacity mode. The control module may be configured to switch the compressor unit among a shutdown state, the first capacity mode and the second capacity mode based on a demand signal and a number of times that the compressor unit has been switched into the shutdown state within a predetermined time period.

In some embodiments, the control module switches the compressor unit between the first and second capacity modes based on a comparison of a total runtime of the compressor unit with a predetermined low-capacity runtime.

In some embodiments, the total runtime of the compressor unit is a period of time over which the compressor unit has been running since most recently being in a shutdown state.

In some embodiments, the control module adjusts the predetermined low-capacity runtime based on the number of times that the compressor unit has been switched into the shutdown state within the predetermined time period.

In some embodiments, the control module increases the predetermined low-capacity runtime if the compressor unit has been switched into the shutdown state more than once during the predetermined time period.

In some embodiments, the control module is configured to switch the compressor unit from the shutdown state to the first capacity mode if the compressor unit has been switched into the shutdown state one or more times within the predetermined time period.

In some embodiments, the control module is configured to switch the compressor unit from the shutdown state to the second capacity mode if the compressor unit has been switched into the shutdown state zero times within the predetermined time period.

In some embodiments, switching the compressor unit from the shutdown state to the second capacity mode includes starting the compressor unit in the first capacity mode and switching to the second capacity mode after running in the first capacity mode for a short time period (e.g., about five seconds or less than one minute).

In some embodiments, the predetermined time period is about forty-five minutes.

In some embodiments, the control module is configured to execute an override function that switches the compressor unit into the second capacity mode in response to input from a user.

In another form, the present disclosure provides a working-fluid circuit that may include an indoor heat exchanger; and outdoor heat exchanger, an expansion device, a variable-capacity compressor, and a control module. The outdoor heat exchanger is in fluid communication with the indoor heat exchanger. The expansion device is disposed between the indoor and outdoor heat exchangers. The variable-capacity compressor circulates working fluid between the indoor and outdoor heat exchangers. The control module may control the compressor and operate the compressor in one of a first capacity mode and a second capacity mode based on a demand signal and a number of times that the compressor has been switched into a shutdown state within a predetermined time period.

In some embodiments, the control module switches the compressor between the first and second capacity modes based on a comparison of a total runtime of the compressor with a predetermined low-capacity runtime.

In some embodiments, the total runtime of the compressor is a period of time over which the compressor has been running since most recently being in a shutdown state.

In some embodiments, the control module adjusts the predetermined low-capacity runtime based on the number of times that the compressor has been switched into the shutdown state within the predetermined time period.

In some embodiments, the control module increases the predetermined low-capacity runtime if the compressor has been switched into the shutdown state more than once during the predetermined time period.

In some embodiments, the control module is configured to switch the compressor from the shutdown state to the first capacity mode if the compressor has been switched into the shutdown state one or more times within the predetermined time period.

In some embodiments, the control module is configured to switch the compressor from the shutdown state to the second capacity mode if the compressor has been switched into the shutdown state zero times within the predetermined time period.

In another form, the present disclosure provides a method of controlling a compressor operable in a first capacity mode and in a second capacity mode that is higher than the first capacity mode. The method may include receiving a demand signal from a thermostat; beginning an observation period; initiating operation of the compressor in the first capacity mode substantially simultaneously with beginning the observation period; tracking a number of times that the compressor has been switched into a shutdown state within the observation period; and operating the compressor in one of the first capacity mode and the second capacity mode based on the number of times that the compressor has been switched into the shutdown state within the observation period.

In some embodiments, the method includes comparing a total runtime of the compressor to a predetermined runtime value.

In some embodiments, the method includes switching the compressor between the first and second capacity modes based on the comparison of the total runtime of the compressor with the predetermined runtime value.

In some embodiments, the total runtime of the compressor is a period of time over which the compressor has been running since most recently being in the shutdown state.

In some embodiments, the predetermined runtime value is a predetermined low-capacity runtime value.

In some embodiments, the method includes adjusting the predetermined low-capacity runtime value based on the number of times that the compressor has been switched into the shutdown state within the observation period.

In some embodiments, adjusting the predetermined low-capacity runtime value includes increasing the predetermined low-capacity runtime value if the compressor has been switched into the shutdown state more than once during the observation period.

In some embodiments, the method includes switching the compressor from the shutdown state to the first capacity mode if the compressor has been switched into the shutdown state one or more times within the observation period.

In some embodiments, the method includes switching the compressor from the shutdown state to the second capacity mode if the compressor has been switched into the shutdown state zero times within the observation period. In some embodiments, switching the compressor from the shutdown state to the second capacity mode includes starting the compressor unit in the first capacity mode and switching to the second capacity mode after running in the first capacity mode for less than one minute.

In some embodiments, the method includes executing an override function that switches the compressor into the second capacity mode in response to input from a user.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
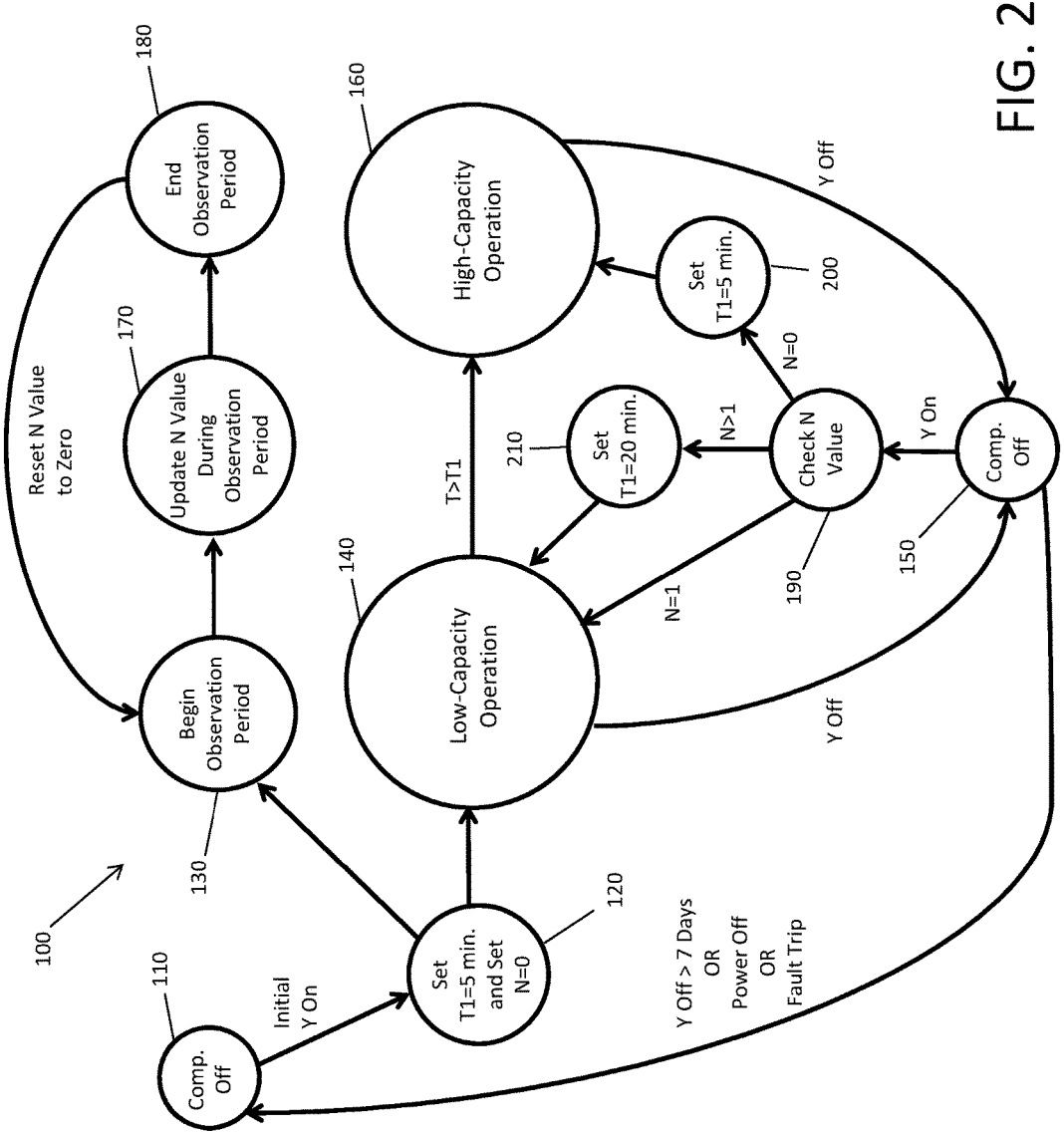

FIG. 1 is a schematic representation of a climate-control system according to the principles of the present disclosure; and FIG. 2 is a state diagram illustrating a method for controlling a compressor of the system of FIG. 1.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a climate-control system 10 is provided that may include a variable-capacity compressor (or a variable-capacity group of compressors) 12, an outdoor heat exchanger 14, an outdoor blower 15, a first expansion device 16, a second expansion device 17, an indoor heat exchanger 18, and an indoor blower 19. In the particular configuration shown in FIG. 1, the system 10 is a heat-pump system having a reversing valve 20 operable to control a direction of working fluid flow through the system 10 to switch the system 10 between a heating mode and a cooling mode. In some configurations, the system 10 may be an air-conditioning system or a refrigeration system, for example, and may be operable in only the cooling mode. As will be described in more detail below, a control module 22 may control operation of the compressor 12 and may switch the compressor 12 between a low-capacity mode and a high-capacity mode based on a signal received from a thermostat 26, a comparison between a runtime T of the compressor 12 and a low-capacity runtime threshold T1, and/or a number of times N that the compressor 12 is switched off and on within a predetermined time period (observation period). The control module 22 may minimize or reduce employment of high-capacity-mode operation to minimize or reduce energy usage while maintaining an acceptable level of comfort within a space to be heated or cooled.

The compressor 12 can be or include a scroll compressor, a reciprocating compressor, or a rotary vane compressor, for example, and/or any other type of compressor. The compressor 12 may be any type of variable-capacity compressor that is operable in at least a low-capacity mode and a high-capacity mode. For example, the compressor 12 may be or include a multi-stage compressor, a group of independently operable compressors, a multi-speed or variable-speed compressor (having a variable-speed or multi-speed motor), a compressor having modulated suction (e.g., blocked suction), a compressor having fluid-injection (e.g., an economizer circuit), a pulse-width-modulated scroll compressor configured for scroll separation (e.g., a digital scroll compressor), a compressor having variable-volume-ratio valves configured to leak intermediate-pressure working fluid, or a compressor having two or more of the above capacity modulation means. It will be appreciated that the compressor 12 could include any other additional or alternative structure for varying its capacity and/or the operating capacity of the system 10. It will be appreciated that the low-capacity and/or high-capacity modes may be continuous, steady-state operating modes, or compressor 12 may be modulated (e.g., pulse-width-modulated) during operation in the low-capacity mode and/or during operation in the high-capacity mode. Exemplary variable-capacity compressors are disclosed in assignee's commonly owned U.S. Pat. No. 8,616,014, U.S. Pat. No. 6,679,072, U.S. Pat. No. 8,585,382, U.S. Pat. No. 6,213,731, U.S. Pat. No. 8,485,789, U.S. Pat. No. 8,459,053, and U.S. Pat. No. 5,385,453, the disclosures of which are hereby incorporated by reference.

The compressor 12, the outdoor heat exchanger 14, the outdoor blower 15, the first expansion device 16 and the reversing valve 20 may be disposed in an outdoor unit 28. The second expansion device 17, the indoor heat exchanger 18 and the indoor blower 19 may be disposed within an indoor unit 30 (e.g., an air handler or furnace) disposed within a home or other building 32. A first check valve 34 may be disposed between outdoor heat exchanger 14 and the first expansion device 16 and may restrict or prevent fluid flow through the first expansion device 16 in the cooling mode and may allow fluid flow through the first expansion device 16 in the heating mode. A second check valve 36 may be disposed between the second expansion device 17 and the indoor heat exchanger 18 and may restrict or prevent fluid flow through the second expansion device 17 in the heating mode and may allow fluid flow through the second expansion device 17 in the cooling mode. It will be appreciated that, in some embodiments, the working fluid conduit connecting the outdoor and indoor heat exchangers 14, 18 may not include one or more the valves 34, 36 and/or expansion devices 16, 17. In such embodiments, additional or alternative structure could be provided to control fluid flow between the outdoor and indoor heat exchangers 14, 18 and control the expansion of fluid flowing therebetween.

The thermostat 26 is disposed inside of the building 32 and outside of the indoor unit 30 and is configured to measure an air temperature within a room or space to be cooled or heated by the system 10. The thermostat 26 can be a single-stage thermostat, for example, that generates only one type of demand signal in response to a temperature within the room or spaced rising above (in the cooling mode) or falling below (in the heating mode) a setpoint temperature. The control module 22 could be disposed in any suitable location, such as inside of or adjacent to the outdoor unit 28 or inside of or adjacent to the indoor unit 30, for example.

In the cooling mode, the outdoor heat exchanger 14 may operate as a condenser or as a gas cooler and may cool discharge-pressure working fluid received from the compressor 12 by transferring heat from the working fluid to air forced over the outdoor heat exchanger 14 by the outdoor blower 15, for example. The outdoor blower 15 could include a fixed-speed, multi-speed or variable-speed fan. In some embodiments, the outdoor heat exchanger 14 may transfer heat from the working fluid to some other fluid (e.g., water) rather than air. In the cooling mode, the indoor heat exchanger 18 may operate as an evaporator in which the working fluid absorbs heat from air forced over the indoor heat exchanger 18 by the indoor blower 19 to cool a space within the home or building 32. The indoor blower 19 could include a fixed-speed, multi-speed or variable-speed fan. In some embodiments, the indoor heat exchanger 18 may transfer heat from the working fluid to some other fluid (e.g., water) rather than air. In the heating mode, the outdoor heat exchanger 14 may operate as an evaporator, and the indoor heat exchanger 18 may operate as a condenser or as a gas cooler and may transfer heat from working fluid discharged from the compressor 12 to a space to be heated.

With reference to FIGS. 1 and 2, a method and control algorithm 100 of the control module 22 will be described. The algorithm 100 may control operation of the compressor 12 and switch the compressor 12 between the low-capacity and high-capacity modes. The algorithm 100 may cause the control module 22 to switch the compressor 12 between a low-capacity mode and a high-capacity mode based on a signal received from the thermostat 26, a comparison between the runtime T of the compressor 12 and the low-capacity runtime threshold T1, and/or the number of times N that the compressor 12 is switched off and on within a predetermined time period (observation period), as described above.

In an initial state 110, the compressor 12 may be off. The thermostat 26 may send a demand signal Y to the control module 22 in response to an air temperature in the space to be heated or cooled by the system 10 dropping below (in the heating mode) or rising above (in the cooling mode) a selected setpoint temperature. In response to receipt of the demand signal Y, the control module 22 may set the low-capacity runtime threshold T1 to five minutes and set the value N to zero at step 120. Then, the control module 22 may substantially simultaneously initiate the observation period at step 130 and initiate operation of the compressor 12 in the low-capacity mode (state 140). Initiating operation of the compressor 12 in the low-capacity mode may reduce or minimize an in-rush of energy and mechanical stress during start-up of the compressor 12.

The compressor 12 may continue to run in the low-capacity mode until the demand signal Y is off, until a runtime T of the compressor 12 (i.e., an elapsed time since startup of the compressor 12 in state 140) is greater than the low-capacity runtime threshold T1, or until the algorithm is overridden (e.g., by a compressor or system fault detection/protection system that shuts down the compressor 12). When the demand signal Y turns off, the compressor 12 may shut down (state 150). If the runtime T of the compressor 12 surpasses the low-capacity runtime threshold T1, the control module 22 may switch the compressor 12 to the high-capacity mode (state 160). Thereafter, the compressor 12 may continue to operate in the high-capacity mode until the demand signal Y turns off and the compressor is shut down (state 150) or until the algorithm 100 is overridden (e.g., by a compressor or system fault detection/protection system that shuts down the compressor 12).

As described above, the control module 22 may initiate the observation period at step 130 substantially simultaneously with initiating operation of the compressor 12 in the low-capacity mode (state 140). During the observation period, the control module 22 may, at step 170, track and record a number of times N that the compressor 12 turns off (in response to the demand signal Y turning off (state 150)) and turns back on from state 150 (in response to the demand signal Y turning back on). The value N may be stored in a memory or data storage module associated with the control module 22. In some embodiments, the observation period may be about forty-five minutes or sixty minutes, for example, or some other length of time. After the observation period ends (state 180), the control algorithm 100 may reset the value N to zero and loop back to step 130. In some embodiments, there may be a time delay between the end of the observation period and the resetting of the value N and/or restarting another observation period. In some embodiments, the control algorithm 100 may reset the value N and restart another observation period immediately after the control algorithm reaches state 180.

In response to the demand signal Y turning on while the compressor 12 is shut down at step 150, the algorithm 100 may increase the value N by one (if a given observation period is still running) and, at step 190, check the value N saved by the control module at step 170. If the value N equals zero at step 190, then the control module 22 may (at step 200) set the low-capacity runtime threshold T1 to five minutes (if T1 is not already set to five minutes) and start the compressor 12 in the low-capacity mode (state 140) and run in the low-capacity mode for a short period of time (e.g., about five seconds) before switching into the high-capacity mode (state 160). Thereafter, the compressor 12 may continue to run in the high-capacity mode until the demand signal Y turns off or until the algorithm 100 is overridden.

If the value N equals one at step 190, then the control module 22 may start the compressor 12 in the low-capacity mode (state 140) and make no change to the low-capacity runtime threshold T1. Thereafter, the compressor 12 may continue to run in the low-capacity mode until the demand signal Y turns off, until the runtime T surpasses the low-capacity runtime threshold T1 (at which time the compressor 12 may be switched to the high-capacity mode), or until the algorithm 100 is overridden.

If the value N is greater than one at step 190, then the control module 22 may set the low-capacity runtime threshold T1 to twenty minutes (at step 210) and start the compressor 12 in the low-capacity mode (state 140). Thereafter, the compressor 12 may continue to run in the low-capacity mode until the demand signal Y turns off, until the runtime T surpasses the low-capacity runtime threshold T1 (at which time the compressor 12 may be switched to the high-capacity mode), or until the algorithm 100 is overridden.

If the compressor 12 remains off in state 150 for longer than a predetermined time period (e.g., seven days or any other selected length of time), if power to the control module 22 or system 10 is shut off, or if the algorithm 100 is overridden by a compressor or system fault detection/protection system, the algorithm 100 may reset to state 110.

It will be appreciated that the T1 and threshold N values given in the description above are exemplary in nature. In some embodiments of the algorithm 100, one or more of the T1 and/or threshold N values may be different from the exemplary values provided above.

In some embodiments, the control module 22 may be configured to execute a high-demand function that may be initiated while the compressor 12 is operating or while the compressor 12 is off and/or while the system 10 is in a standby state. The high-demand function may override the algorithm 100 (or any other algorithm that is being executed by the control module 22). A user may initiate the high-demand function if, for example, the user wants to cool the room or building as quickly as possible with reduced concern for or with no regard for energy usage or energy efficiency. When the high-demand function is initiated, the control module 22 will cause the compressor 12 to operate in the high-capacity mode and allow the compressor 12 to remain in the high-capacity mode until the air temperature read by the thermostat 26 reaches or falls below a desired setpoint temperature or until a compressor or system fault detection/protection system shuts down the compressor 12.

The user may initiate the high-demand function by turning the demand signal Y on and off at least a predetermined number of times within a predetermined time period. For example, the predetermined number of times could be three and the predetermined time period could be fifteen seconds. It will be appreciated that the predetermined number of times could be any other number and the predetermined time period could be any other duration.

Additionally or alternatively, the control module 22 could be configured so that other actions by the user may initiate the high-demand function. For example, a system control device (e.g., on the thermostat 26 or on a remote system control device such as a smartphone, tablet or other computer) may include a button, switch, dial or other interface that, if actuated, causes the control module 22 to initiate the high-demand function. The control module 22 may be configured so that other actions and/or conditions will initiate the high-demand function.

Throughout this application, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores data and/or code executed by a processor; other suitable hardware components that provide the described functionality; or a combination of some or all of the above, such as in a system-on-chip.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A climate-control system including a variable-capacity compressor unit and a control module controlling the compressor unit, the compressor unit operable in a first capacity mode and in a second capacity mode that is higher than the first capacity mode, the control module configured to switch the compressor unit among a shutdown state, the first capacity mode and the second capacity mode,
wherein the control module switches the compressor unit between the first and second capacity modes based on a comparison of a total runtime of the compressor unit with a predetermined low-capacity runtime,
wherein the total runtime of the compressor unit is a period of time over which the compressor unit has been running since most recently being in a shutdown state,
wherein the control module adjusts the predetermined low-capacity runtime based on a number of times within a predetermined time period that the compressor unit has been switched into the shutdown state due to a demand signal switching from on to off.

2. The climate-control system of claim 1, wherein the control module increases the predetermined low-capacity runtime if the compressor unit has been switched into the shutdown state more than once due to the demand signal switching from on to off during the predetermined time period.

3. The climate-control system of claim 1, wherein the control module is configured to switch the compressor unit from the shutdown state to the first capacity mode if the compressor unit has been switched into the shutdown state one or more times due to the demand signal switching from on to off within the predetermined time period.

4. The climate-control system of claim 1, wherein the control module is configured to switch the compressor unit from the shutdown state to the second capacity mode if the compressor unit has been switched into the shutdown state due to the demand signal switching from on to off zero times within the predetermined time period.

5. The climate-control system of claim 4, wherein switching the compressor unit from the shutdown state to the second capacity mode includes starting the compressor unit in the first capacity mode and switching to the second capacity mode after running in the first capacity mode for less than one minute.

6. The climate-control system of claim 1, wherein the predetermined time period is about forty-five minutes.

7. The climate-control system of claim 1, wherein the control module is configured to execute an override function that switches the compressor unit into the second capacity mode in response to input from a user.

8. A working-fluid circuit comprising:
an indoor heat exchanger;
an outdoor heat exchanger in fluid communication with the indoor heat exchanger;
an expansion device between the indoor and outdoor heat exchangers;
a variable-capacity compressor circulating working fluid between the indoor and outdoor heat exchangers; and
a control module controlling the compressor and operating the compressor in one of a first capacity mode and a second capacity mode,
wherein the control module switches the compressor unit between the first and second capacity modes based on a comparison of a total runtime of the compressor unit with a predetermined low-capacity runtime,
wherein the total runtime of the compressor unit is a period of time over which the compressor unit has been running since most recently being in a shutdown state,
wherein the control module adjusts the predetermined low-capacity runtime based on a number of times within a predetermined time period that the compressor unit has been switched into the shutdown state due to a demand signal switching from on to off.

9. The working-fluid circuit of claim 1, wherein the control module increases the predetermined low-capacity runtime if the compressor has been switched into the shutdown state more than once due to the demand signal switching from on to off during the predetermined time period.

10. The working-fluid circuit of claim 8, wherein the control module is configured to switch the compressor from the shutdown state to the first capacity mode if the compressor has been switched into the shutdown state due to the demand signal switching from on to off one or more times within the predetermined time period.

11. The working-fluid circuit of claim 8, wherein the control module is configured to switch the compressor from the shutdown state to the second capacity mode if the compressor has been switched into the shutdown state due to the demand signal switching from on to off zero times within the predetermined time period.

12. The working-fluid circuit of claim 8, wherein the control module is configured to execute an override function that switches the compressor into the second capacity mode in response to input from a user.

* * * * *